N. H. HILLER.
ABSORPTION REFRIGERATION APPARATUS.
APPLICATION FILED FEB. 21, 1916.
1,199,381.
Patented Sept. 26, 1916.
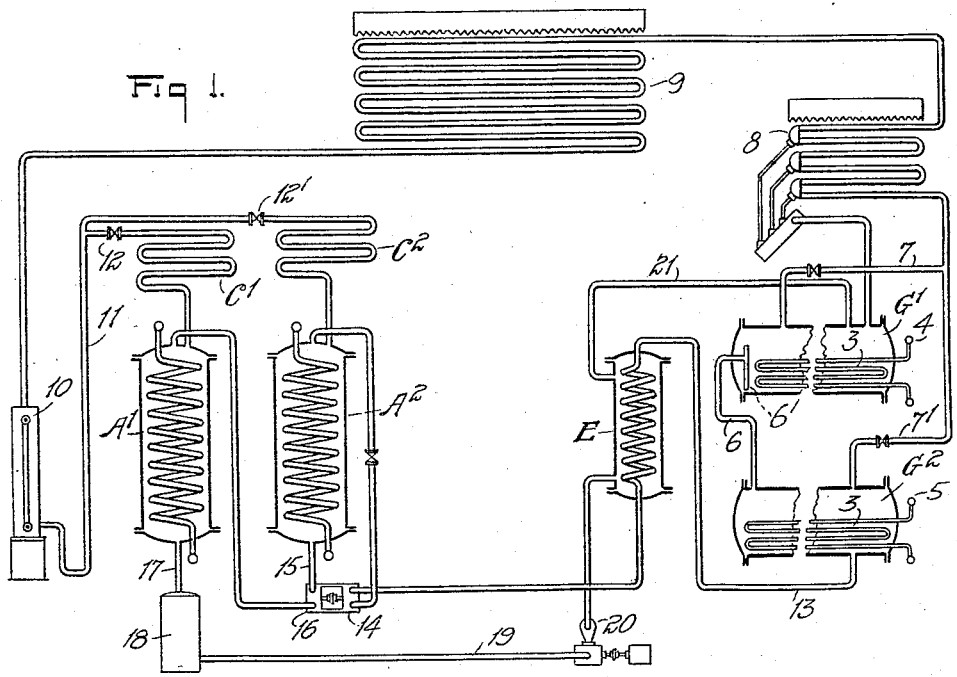
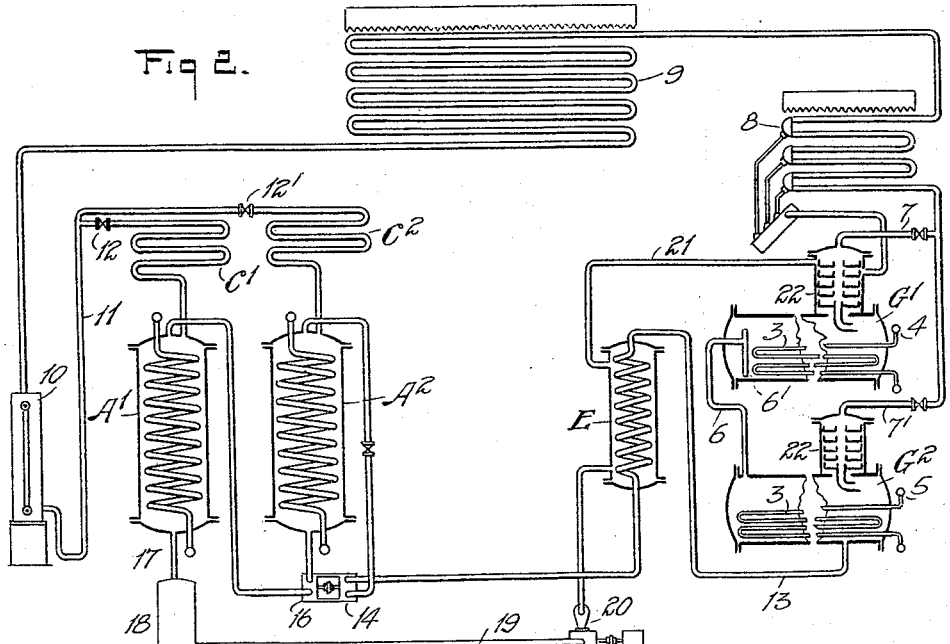

UNITED STATES PATENT OFFICE.

NICOLAI H. HILLER, OF CARBONDALE, PENNSYLVANIA.

ABSORPTION REFRIGERATION APPARATUS.

1,199,381.  Specification of Letters Patent.  Patented Sept. 26, 1916.

Application filed February 21, 1916. Serial No. 79,522.

*To all whom it may concern:*

Be it known that I, NICOLAI H. HILLER, a citizen of the United States of America, and a resident of Carbondale, county of Lackawanna, State of Pennsylvania, have invented certain new and useful Improvements in Absorption Refrigeration Apparatus, of which the following is a specification.

My invention relates to improvements in absorption refrigeration apparatus, and comprises a multi-stage generator or still the several stages of which are heated by heating fluids of progressively higher temperature, the liquid heated being transferred progressively from a stage of lower temperature to a stage of higher temperature; such multi-stage generator being used, preferably, in connection with a multi-stage absorber.

My invention also comprises improved means for transferring the absorbing liquid from stage to stage of the absorber.

The object of my invention is to increase the efficiency of absorption refrigeration apparatus.

I will now proceed to describe my invention with reference to the accompanying drawings and will then point out the novel features in claims.

In said drawings: Figure 1 shows diagrammatically one form of my apparatus, the generators, absorbers and exchanger being shown in section. Fig. 2 is a similar view illustrating the use of a rectifier in connection with one stage of the generator.

In the ordinary absorption refrigeration apparatus, employing a single stage absorber only, there is no material advantage to be gained from the use of a multi-stage generator, the difference in ammonia content between the strong liquor and the weak liquor being too small; being in practice only from six to eight per cent.; but the contrary is the case when a multi-stage absorber is employed; it being possible, with a two stage absorber, to obtain a difference of between fifteen and twenty per cent. of ammonia content between the strong liquor and weak liquor; in such case it is practicable to employ a multi-stage generator, one stage of which is heated by very low pressure exhaust steam, the other stage or stages of the generator being operated by higher pressure steam, for example, the exhaust of non-condensing engines, such for example as the pumps and other auxiliaries commonly employed in absorption refrigeration apparatus or other steam engines available for the supply of exhaust steam to the refrigeration apparatus. It is not practicable to employ both low pressure steam and higher pressure exhaust steam or live steam in different heating coils of the same generator stage, as the higher pressure steam tends to heat the liquor in the generator to a temperature above that of the low pressure steam, which liquor in turn tends to heat such low pressure steam; with the result that the low pressure steam, instead of imparting heat to the liquor, takes heat therefrom; but the contrary is the case when the generator is divided into a plurality of stages, corresponding more or less approximately, to the different temperatures of steam supply available.

Referring first to Fig. 1, $G^1$ designates a low temperature stage of the generator, and $G^2$ designates a higher temperature stage of the generator, each stage being shown as provided with heating coils 3 arranged as is customary. The coils 3 of generator stage $G^1$ are connected to a source of low pressure steam 4 and the coils of generator stage $G^2$ are connected to a source of higher pressure steam 5. 6 designates a conduit for conveying what is the weak liquor of generator stage $G^1$ to generator stage $G^2$; this conduit 6 having an extension 6' leading to near the bottom of generator $G^1$ so that conduit 6 will draw liquor from near the bottom of generator stage $G^1$. 7 designates a conduit for conveying ammonia vapor from generator stage $G^1$, and 7' designates a conduit for conveying ammonia vapor from generator stage $G^2$, the two conduits being both connected to the rectifier 8; the vapor from this rectifier passing to the usual condenser 9 and thence to the usual anhydrous receiver 10; from which receiver the anhydrous ammonia is delivered through pipe 11 to expansion valves 12 and 12' of cooling coils $C^1$ and $C^2$, usually operated at different temperature planes, and discharging their return gas into corresponding absorbers $A^1$ and $A^2$. 13 designates the usual conduit for returning the weak liquor to the absorber, such conduit being connected in this instance to the lower portion of the higher temperature generator stage $G^2$ and passing through the exchanger E and thence passing through a pump motor 14 to the lower-pressure absorber stage $A^2$. In this lower pressure absorber stage $A^2$ the weak liquor from the generator encounters the lower pressure return gas from the lower-temperature plane cooler C² and absorbs such gas; the resulting liquor passing out through pipe 15 and pump 16 driven by motor 14 into the higher pressure absorber stage A¹ where it meets the ammonia gas from the higher temperature plane cooler C¹, and absorbs the same. The resulting strong liquor passes through pipe 17 to strong liquor receiver 18 and thence through conduit 19 and pump 20 to exchanger E and thence through conduit 21 to the upper stage G¹ of the generator, the cycle above described being then repeated.

It is obvious that the two generator stages G¹ and G² constitute a series of generators; and that the number of such generator stages might be increased without departure from my invention, the weak liquor from any lower temperature stage of the series being discharged into a higher temperature generator stage of the series, each lower stage of the series being heated by steam or other suitable heating agent of a temperature lower than that which heats the higher stage or stages of the series.

Fig. 2 shows an arrangement of apparatus similar to that of Fig. 1, except that each generator stage is provided with an analyzer 22, such as is commonly employed in connection with single stage generators of absorption refrigeration apparatus.

What I claim is:—

1. Absorption refrigeration apparatus comprising a multi-stage generator consisting of a series of separate generators to be operated at different temperature planes, and having independent heating means connected to sources of supply of heating fluid of progressively higher temperature through the series, and means for the transfer of weak liquor from a lower temperature generator to a higher temperature generator in the series, a condenser connected to receive and condense the vapor discharged by said generators, a plurality of coolers arranged to operate at different temperature planes and to expand the liquefied product from such condenser, a series of absorbers arranged each to receive, at its appropriate pressure plane, the vapor produced in a corresponding one of said coolers, and means for transferring the weak liquor from the last generator of the generator series to the first absorber of the absorber series and thence progressively through the absorber series, and means for transferring the final strong liquor from the last absorber to the first generator of the generator series.

2. In absorption refrigeration apparatus, the combination with a plurality of absorbers and a generator, of means for transferring the weak liquor from such generator to one absorber of the absorber series, and means for transferring the liquor from that absorber to another absorber comprising a pump and a motor driving that pump and operated by the weak liquor from the generator on its passage to the absorber to which that weak liquor is supplied as aforesaid.

In testimony whereof I have signed this specification in the presence of two subscribing witnesses.

NICOLAI H. HILLER.

Witnesses:
H. M. MARBLE,
PAUL H. FRANKE.

Copies of this patent may be obtained for five cents each, by addressing the "Commissioner of Patents, Washington, D. C."